(12) United States Patent
Yamaguchi et al.

(10) Patent No.: US 6,406,513 B2
(45) Date of Patent: Jun. 18, 2002

(54) NICKEL POWDER AND CONDUCTIVE PASTE

(75) Inventors: Yasuhide Yamaguchi; Takao Hayashi, both of Yamaguchi (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/773,908

(22) Filed: Feb. 2, 2001

(30) Foreign Application Priority Data

Feb. 3, 2000 (JP) ........................................ 2000-026319

(51) Int. Cl.⁷ .................................................. B22F 1/00
(52) U.S. Cl. ......................................... 75/255; 252/513
(58) Field of Search ............................... 75/255; 252/513

(56) References Cited

U.S. PATENT DOCUMENTS

| 3,711,274 A | * | 1/1973 | Montino et al. | |
| 3,748,118 A | * | 7/1973 | Montino et al. | |
| 3,850,612 A | * | 11/1974 | Montino et al. | |
| 4,089,676 A | * | 5/1978 | Grundy | |
| 6,120,576 A | * | 9/2000 | Toshima et al. | ............... 75/370 |
| 6,316,100 B1 | * | 11/2001 | Kodas et al. | ............... 428/357 |

* cited by examiner

*Primary Examiner*—Ngoclan Mai
(74) *Attorney, Agent, or Firm*—Young & Thompson

(57) ABSTRACT

Nickel powder herein disclosed has an average particle size, as determined by the observation with SEM, of not more than 1 μm, a particle density of not less than 8.0 g/cm³, and an average diameter of crystallites present in the nickel particles of not more than 550 Å. Moreover, a conductive paste for a multilayer ceramic capacitor comprises the foregoing nickel powder. The nickel powder and the conductive paste containing the same can control heat shrinkage while inhibiting any rapid oxidation and permit the production of a thin, uniform internal electrode for a multilayer ceramic capacitor without being accompanied by any crack formation and delamination during firing.

8 Claims, No Drawings

NICKEL POWDER AND CONDUCTIVE PASTE

BACKGROUND OF THE INVENTION (a) Field of the Invention

The present invention relates to nickel powder and a conductive paste containing the same and more particularly to nickel powder and a conductive paste containing the same, which can control heat shrinkage while inhibiting the occurrence of any rapid oxidation and which permit the production of a thin, uniform internal electrode for a multilayer ceramic capacitor without being accompanied by any crack formation and delamination during firing.

(b) Description of the Prior Art

A multilayer ceramic capacitor comprises a plurality of ceramic dielectric layers and internal electrode layers, which are alternately laminated and united. In the production of the internal electrode for such a multilayer ceramic capacitor, it is common that metal fine powder as a material for internal electrodes is first formed into a paste thereof to give a conductive paste, followed by printing a green sheet of a ceramic dielectric with the resulting conductive paste, alternately putting, in layers, a plurality of these green sheets of the ceramic dielectric and the conductive paste layers, attaching the latter to the former using pressure to thus unify them, and then firing the resulting laminated assembly in a reducing atmosphere at a high temperature to thus firmly unify the ceramic dielectric layers and the internal electrodes.

As materials for such an internal electrode, there have conventionally been used, for instance, precious metals such as platinum, palladium and silver-palladium. However, there have recently been developed techniques in which base metals such as nickel are substituted for these precious metals and such techniques have gradually been advanced, for the purpose of reducing the production cost. When forming a conductive paste layer using a paste containing nickel powder and then firing the resulting paste layer to produce a thin and uniform internal electrode, however, problems such as crack formation and delamination arise. The occurrence of such crack formation and delamination would be caused due to, for instance, heat shrinkage of the conductive paste layer during firing.

Accordingly, there have conventionally been proposed a variety of powdery nickel products, which can solve the problem of heat shrinkage during firing.

SUMMARY OF THE INVENTION

Similarly, it is an object of the present invention to provide nickel powder as well as a conductive paste containing the nickel powder, which can control heat shrinkage while inhibiting the occurrence of any rapid oxidation and which accordingly, permit the production of a thin, uniform internal electrode for a multilayer ceramic capacitor without being accompanied by any crack formation and delamination during firing.

The inventors of this invention have conducted various studies to solve the foregoing problems associated with the conventional techniques, have found that the foregoing problems of rapid increase in the oxidation of the conductive paste layer and the heat shrinkage thereof during firing are solved by increasing the average particle density of the nickel powder to a level greater than a desired value and reducing the average diameter of the crystallites present in the particles to a level smaller than a predetermined value and that the resulting conductive paste permits gentle sintering, can ensure a uniform sintering speed and accordingly, permits the formation of a thin and uniform internal electrode for a multilayer ceramic capacitor without being accompanied by any crack formation and delamination, and have thus completed the present invention based on the foregoing findings.

According to an aspect of the present invention, there is provided nickel powder having an average particle size, as determined by the observation under a scanning electron microscope (SEM), of not more than 1 $\mu$m, a particle density of not less than 8.0 g/cm$^3$, and an average diameter of crystallites present in the nickel particles of not more than 550 Å.

According to a second aspect of the present invention, there is provided a conductive paste, which comprises nickel powder having characteristic properties defined above.

DETAILED DESCRIPTION OF THE INVENTION

The nickel powder of the present invention is particularly suitable for use in making an internal electrode for a multilayer ceramic capacitor or in the preparation of a conductive paste for a multilayer ceramic capacitor. Accordingly, the average particle size of the nickel powder of the present invention, as determined by the observation thereof with an SEM with a magnification of about ×10000, is limited to a level of not more than 1 $\mu$m, preferably 0.1 to 1 $\mu$m and more preferably 0.2 to 0.8 $\mu$m, while taking into consideration the foregoing applications of the nickel powder.

The meaning of the term "particle density", used in this specification, is identical to that defined in JIS R 1600 (1993). More specifically, the term "particle density" is the density of particles, in which the closed spaces included in the particles are likewise regarded as parts of particles. If the particle density is reduced, the amount of void spaces present within particles correspondingly increases, while if the particle density increases, the amount of void spaces present within particles are correspondingly reduced. These void spaces expand when exposed to a high temperature during the high temperature firing step in the production of a multilayer ceramic capacitor and at least part thereof is destroyed to cause shrinkage of the particle. Thus, the presence of such void spaces would greatly affect the thermal properties, in particular, heat shrinkage of the conductive paste layer containing nickel powder. In the present invention, the particle density of the nickel powder is controlled to not less than 8.0 g/cm$^3$, preferably not less than 8.3 g/cm$^3$ and more preferably not less than 8.5 g/cm$^3$. Increasing the particle density of the nickel powder can thus eliminate the problems of any crack formation and delamination.

Moreover, the average diameter of crystallites present in the nickel particles of nickel powder of the present invention is controlled to a level of not more than 550 Å, preferably not more than 500 Å and more preferably not more than 300 Å. A product obtained using a paste containing such nickel powder, for instance, a multilayer ceramic capacitor, is composed of a tidy sintered film and the sintering of the paste proceeds gently because the average diameter of the crystallites present in the nickel particles is small. In other words, the sintering of such a paste rapidly proceeds if the crystallites present in the nickel particles have a large diameter, but if the average diameter thereof is small, the crystallites present in the nickel particles are first sintered and then the sintering between the nickel particles gradually proceeds. Accordingly, the nickel powder-containing paste is gradually sintered at a uniform speed to thus form a tidy film and the paste hardly causes any crack formation and delamination.

As has been discussed above in detail, the nickel powder of the present invention has an average particle size as determined by the SEM observation thereof of not more than 1 μm, a particle density of not less than 8.0 g/cm$^3$, and an average diameter of crystallites present in the nickel particle of not more than 550 Å. Accordingly, the conductive paste obtained using such nickel powder would permit the formation of a thin and uniform internal electrode for a product such as a multilayer ceramic capacitor, without causing any crack formation and delamination during firing.

The nickel powder of the present invention, which satisfies various requirements discussed above, is suitably used for preparing a conductive paste, in particular, a conductive paste for making a multilayer ceramic capacitor.

Therefore, the conductive paste according to the present invention comprises the foregoing nickel powder having excellent characteristic properties described above and is thus particularly suitable for use in making a thin and uniform internal electrode for a multilayer ceramic capacitor.

Now, we will hereunder explain a preferred method for preparing the nickel powder of the present invention.

The nickel powder of the present invention can be prepared by either a wet method or a dry method, but it is preferably prepared by a wet method. In such a wet method for preparing the nickel powder of the present invention, for example, nickel hydroxide prepared by reacting a nickel salt with an alkali or commercially available nickel hydroxide per se is reduced by bringing it into contact with a hydrazine type reducing agent at a temperature condition of not less than 55° C., while the rate of nucleation and the rate of growth of fine nickel particles are stepwise controlled. Examples of such nickel salts are nickel sulfate, nickel nitrate and nickel halides such as nickel chloride. On the other hand, examples of such alkalis are sodium hydroxide, potassium hydroxide and calcium hydroxide. Examples of the foregoing hydrazine type reducing agents are hydrazine, hydrazine hydrate, hydrazine sulfate, hydrazine carbonate and hydrazine hydrochloride.

Regarding the temperature conditions for the reducing reaction of the nickel hydroxide, it is preferable to add a reducing agent to the reactant at a temperature of less than 50° C. and then gradually raise the temperature to a temperature of not less than 55° C. to proceed the reaction slowly. By using this process, a nickel powder can be obtained, which has a small average diameter of crystallites, a high particle density and a uniform average particle size.

In particular, the nickel powder having a particle density of not less than 8.0 g/cm$^3$ and a uniform particle size as determined by the SEM observation can be prepared by adding an aqueous solution of hydrazine to nickel hydroxide obtained through a reaction of a nickel salt with sodium hydroxide or commercially available nickel hydroxide per se at a temperature of less than 50° C. and then gradually raising the temperature at a heating speed of not more than 5° C./min to a temperature of not less than 55° C., preferably not less than 60° C. to proceed the reduction slowly and the resulting nickel powder has a quite low content of the whole impurities derived from the starting materials.

The nickel powder of the present invention can be obtained in the form of monodispersed nickel powder, which is obtained by bringing nickel hydroxide into contact with a hydrazine type reducing agent at a temperature of not less than 55° C. to thus reduce the hydroxide and then the resulting powdery product is subjected to a pulverization treatment. Such pulverization treatment usable herein are, for instance, high speed rotary collision-pulverization treatment in which nickel powder is pulverized by leading a rotary part, rotating at a high speed, of a pulverizer to collide with the powder; a medium-stirring pulverization treatment in which nickel powder is stirred with, for instance, beads to thus pulverize the same; a high hydraulic pressure pulverization treatment, which comprises colliding two streams of aqueous nickel powder slurries injected from different directions at a high hydraulic pressure to thus pulverize the nickel powder; and a jet-impact treatment and one can use, for instance, a high speed moving body-collision type air pulverizer, an impact type pulverizer, a cage mill, a medium-stirring type mill, axial-flow mill and a jet-colliding device.

Next, we will explain a preferred method for preparing a conductive paste according to the present invention, below in detail.

The conductive paste of the present invention is constituted by, for instance, the foregoing nickel powder of the present invention, a resin and a solvent. Optionally, it may further comprise a dispersant, a sintering-inhibitory agent or the like. More specifically, examples of such resins usable herein are cellulose derivatives such as ethyl cellulose, vinylic non-curable resins such as acrylic resins, polyvinyl butyral resins and polyvinyl alcohol, and thermosetting resins preferably used in combination with peroxides, such as epoxy resins and acrylic resins. Resins usable herein further include, for instance, UV curable resins, electron beam-curable resins such as epoxy acrylate resins, polybutadiene acrylate resins and urethane acrylate resins modified with acrylic acid or methacrylic acid, and unsaturated polyesters. In this connection, in case where the resin used is a UV curable resin, an optical initiator should be used and examples thereof include benzoin, acetophenone, benzyl, benzophenone and benzoin butyl ether. In addition, examples of such solvents usable herein are terpineol, tetralin, butyl carbitol and carbitol acetate, which may be used alone or in any combination. Moreover, this paste may if necessary comprise glass frits. The conductive paste of the present invention can be prepared by mixing and stirring the foregoing raw materials in a mixing device such as a ball mill or a three-roll mill.

The nickel powder of the present invention permits the control of any thermal shrinkage of the resulting sheet or film while inhibiting any rapid oxidation and as a result, the powder permits the formation of a thin and uniform internal electrode for a multilayer ceramic capacitor without causing any crack formation and delamination. Thus, the nickel powder of the present invention is suitably used for preparing a conductive paste, in particular, a conductive paste for a multilayer ceramic capacitor.

In addition, the conductive paste according to the present invention comprises nickel powder having the foregoing excellent characteristic properties and therefore, the paste is particularly suitably used in making a thin and uniform internal electrode for a multilayer ceramic capacitor.

The present invention will now be described below in detail with reference to the following working Examples and Comparative Examples.

EXAMPLE 1 (WORKING EXAMPLE)

To one liter of an aqueous solution of sodium hydroxide having a concentration of 200 g/L, there was gradually dropwise added an aqueous solution prepared by dissolving 448 g of nickel sulfate hexahydrate (nickel content: 22.2% by mass) in 800 mL of pure water, while maintaining the temperature of the mixture to 60° C. to thus precipitate nickel hydroxide. The resulting suspension was cooled to 40° C. and then 300 g of hydrazine monohydrate was added slowly over 30 minutes to control temperature rise. After the addition was finished, the suspension was gradually heated at a heating speed of 1° C./min to a temperature of 60° C. As the temperature raised, the nickel hydroxide was reduced into elemental nickel slowly. The resulting nickel particles was pulverized. The nickel powder thus prepared was washed with pure water till the pH of the wash liquid reached a level of not more than 9, followed by filtration thereof and drying to give a final nickel powder.

The resulting nickel powder was observed under an SEM with a magnification of ×10000 and particle sizes of 1500 particles present in randomly selected 5 visual fields were determined. As a result, the average particle size of the nickel powder was found to be 0.58 µm. Moreover, the particle density of this nickel powder was determined at room temperature using Multivolume Pycnometer 1305 (available from Micrometrics Co., Ltd. In the United States) and it was found to be 8.71 g/cm$^3$. In addition, the average diameter of crystallites present in the nickel particles was likewise determined and was found to be 168 Å.

Further, a pressure of 1 t/cm$^3$ was applied to 0.5 g of the nickel powder to thus convert the powder into a pellet having a diameter of 5 mm and a height of about 6 mm. This pellet was inspected for the heat shrinkage using a thermo-mechanical analysis device (TMA/SS6000 available from Seiko Instruments Inc.) in a nitrogen gas atmosphere at a heating speed of 10° C./min. As a result, results shown in the following Table 1 were obtained. In this connection, each heat shrinkage value was one relative to that observed for the pellet prior to heating.

Separately, there was added, to 100 part by mass of the nickel powder, a vehicle, which consisted of 8 parts by mass of ethyl cellulose, 100 parts by mass of terpineol and 12 parts by mass of butyl carbitol, followed by admixing these ingredients, then kneading them in a roll mill to form a conductive paste and preparation of a multilayer ceramic capacitor of 2.0×1.25×1.25 mm by firing an assembly comprising 350 laminated layers of dielectric layers (each having a thickness of 2 µm) and internal electrode layers prepared from the conductive paste (each having a thickness of 1.5 µm). Then the number of rejected products was determined by randomly selecting 200 multilayer ceramic capacitors among these capacitors thus prepared and inspection of them for the crack formation and delamination. As a result, the number of rejected products was found to be 4 and accordingly, the reject rate was calculated to be only 2%.

The results obtained in the foregoing determination and evaluation are summarized and listed in the following Table 1.

EXAMPLE 2 (WORKING EXAMPLE)

To one liter of an aqueous solution of sodium hydroxide having a concentration of 200 g/L, there was gradually dropwise added an aqueous solution prepared by dissolving 448 g of nickel sulfate hexahydrate (nickel content: 22.2% by mass) in 800 mL of pure water, while maintaining the temperature of the mixture to 60° C. to thus precipitate nickel hydroxide. The resulting suspension was cooled to 40° C. and then 420 g of hydrazine monohydrate was added slowly over 40 minutes to control temperature rise. After the addition was finished, the suspension was gradually heated at a heating speed of 4° C./min to a temperature of 65° C. As the temperature raised, the nickel hydroxide was reduced into elemental nickel slowly. The resulting nickel particles was pulverized. The nickel powder thus prepared was washed with pure water till the pH of the wash liquid reached a level of not more than 9, followed by filtration thereof and drying to give a final nickel powder.

The resulting nickel powder was subjected to the determination of various characteristic properties according to the same methods used in Example 1. Moreover, a conductive paste and multilayer ceramic capacitors were prepared by repeating the same procedures used in Example 1 to thus determine the number of products rejected due to crack formation and delamination according to the same method used in Example 1. The results thus obtained in the foregoing determination and evaluation are likewise summarized and listed in the following Table 1.

EXAMPLE 3 (COMPARATIVE EXAMPLE)

To one liter of an aqueous solution of sodium hydroxide having a concentration of 140 g/L, there was gradually dropwise added an aqueous solution prepared by dissolving 448 g of nickel sulfate hexahydrate (nickel content: 22.2% by mass) in 1 L of pure water, while maintaining the temperature of the mixture to 45° C. to thus precipitate nickel hydroxide. To the resulting suspension, there was added 260 g of hydrazine monohydrate over 20 minutes to thus reduce the nickel hydroxide into elemental nickel and then pulverization of the resulting nickel particles. The nickel powder thus prepared was washed with pure water till the pH of the wash liquid reached a level of not more than 9, followed by filtration thereof and drying to give a final nickel powder.

The resulting nickel powder was subjected to the determination of various characteristic properties according to the same methods used in Example 1. Moreover, a conductive paste and multilayer ceramic capacitors were prepared by repeating the same procedures used in Example 1 to thus determine the number of products rejected due to crack formation and delamination according to the same method used in Example 1. The results thus obtained in the foregoing determination and evaluation are likewise summarized and listed in the following Table 1.

EXAMPLE 4 (COMPARATIVE EXAMPLE)

Sufficiently dried anhydrous nickel chloride (22.0 kg) having a sulfur content of 500 ppm was allowed to stand in a quartz container and then heated in an argon gas stream as a carrier having a flow rate of 10 L/min while maintaining the temperature within the container to 900° C. to thus evaporate nickel chloride. Hydrogen gas for reduction was passed through the vaporized nickel chloride gas, at a flow rate of 3.5 L/min, while controlling the reduction temperature to 1000° C. to thus convert the nickel chloride gas into nickel powder. The resulting nickel powder was washed with pure water till the pH of the wash liquid was not more than 9, followed by filtration thereof, then drying and introduction of the nickel powder thus washed with water into a pulverizer Model AP-1SH (available from Hosokawa Micron Co., Ltd.) equipped with a knife-like hammer to thus pulverize the nickel powder at a rotational speed of 2500 rpm. The pulverized nickel powder was treated using an air separator, i.e., SF Sharp Cut Separator Model KSC-02 (available from Kurimoto, Ltd.) at a rotational speed of a rotor of 6000 rpm and a flow rate of the air of 7.2 m$^3$/min to thus remove coarse particles and to give final nickel powder.

The resulting nickel powder was subjected to the determination of various characteristic properties according to the same methods used in Example 1. Moreover, a conductive paste and multilayer ceramic capacitors were prepared by repeating the same procedures used in Example 1 to thus determine the number of products rejected due to crack formation and delamination according to the same method used in Example 1. The results thus obtained in the foregoing determination and evaluation are likewise summarized and listed in the following Table 1.

TABLE 1

|  | Example Number | | | |
| --- | --- | --- | --- | --- |
|  | 1 | 2 | 3* | 4* |
| Average Particle Size (μm) | 0.58 | 0.22 | 0.71 | 0.62 |
| Particle Density (g/cm$^3$) | 8.71 | 8.31 | 7.68 | 8.68 |
| Average Diameter of Crystallite (Å) | 168 | 142 | 152 | 560 |
| Heat Shrinkage (%) | | | | |
| 500° C. | −0.2 | −0.4 | −0.6 | −0.4 |
| 700° C. | −0.6 | −0.5 | −1.9 | −0.8 |
| 900° C. | −2.8 | −2.2 | −7.8 | −4.8 |
| 1100° C. | −8.6 | −7.7 | −14.3 | −12.7 |

TABLE 1-continued

|  | Example Number | | | |
| --- | --- | --- | --- | --- |
|  | 1 | 2 | 3* | 4* |
| Evaluation of Ceramic Capacitor | | | | |
| Number of Rejected Products (number) | 4 | 2 | 24 | 20 |
| Reject Rate (%) | 2 | 1 | 12 | 10 |

*: Comparative Example

What is claimed is:

1. Nickel powder having an average particle size, as determined by the observation with SEM, of not more than 1 μm, a particle density of not less than 8.0 g/cm$^3$, and an average diameter of crystallites present in the nickel particles of not more than 300 Å.

2. The nickel powder as set forth in claim 1 wherein it has an average particle size, as determined by the observation with SEM, ranging from 0.1 to 1 μm, and a particle density of not less than 8.3 g/cm$^3$.

3. The nickel powder as set forth in claim 1 wherein it is prepared according to a wet method.

4. The nickel powder as set forth in claim 2 wherein it is prepared according to a wet method.

5. A conductive paste for a multilayer ceramic capacitor comprising nickel powder as set forth in claim 1.

6. A conductive paste for a multilayer ceramic capacitor comprising nickel powder as set forth in claim 2.

7. A conductive paste for a multilayer ceramic capacitor comprising nickel powder as set forth in claim 3.

8. A conductive paste for a multilayer ceramic capacitor comprising nickel powder as set forth in claim 4.

* * * * *